(12) United States Patent
Seo

(10) Patent No.: US 12,159,270 B2
(45) Date of Patent: Dec. 3, 2024

(54) VENDING MACHINE SYSTEM

(71) Applicant: IncuTech Co., Ltd., Seoul (KR)

(72) Inventor: Ji Weon Seo, Goyang-si (KR)

(73) Assignee: IncuTech Co., Ltd., Seoul (KR)

( * ) Notice: Subject to any disclaimer, the term of this patent is extended or adjusted under 35 U.S.C. 154(b) by 186 days.

(21) Appl. No.: 17/503,375

(22) Filed: Oct. 18, 2021

(65) Prior Publication Data

US 2023/0055855 A1    Feb. 23, 2023

(30) Foreign Application Priority Data

Aug. 23, 2021    (KR) .......................... 10-2021-0110707

(51) Int. Cl.
  *G06Q 20/18*    (2012.01)
  *G06Q 20/34*    (2012.01)
(52) U.S. Cl.
  CPC ........... *G06Q 20/18* (2013.01); *G06Q 20/341* (2013.01)
(58) Field of Classification Search
  CPC .... G06Q 20/18; G06Q 20/32; G06Q 30/0207; G06Q 30/0251; G06Q 30/0631; G07F 9/001; G07F 9/006; G07F 9/026
  See application file for complete search history.

(56) References Cited

U.S. PATENT DOCUMENTS 5,020,958 A * 6/1991 Tuttobene ............... G07F 11/62
                                                          414/281
7,464,867 B1 * 12/2008 Kolls ........................ G06F 7/08
                                                          235/449

(Continued)

FOREIGN PATENT DOCUMENTS

GB    2561417 A  * 10/2018  ....... G06K 19/06037
JP    2011509465 A  *  3/2011

(Continued)

OTHER PUBLICATIONS

Xia, K., Huang, J., Wang, H., Ren, J., Jian, Q., & Wei, D. (2021). An intelligent self-service vending system for smart retail. Sensors, 21(10), 3560. doi:https://doi.org/10.3390/s21103560 (Year: 2021).*

(Continued)

*Primary Examiner* — Ashford S Hayles
(74) *Attorney, Agent, or Firm* — Insight Law Group, PLLC; Seung Lee

(57) ABSTRACT

A vending machine system includes: a vending machine including at least one legacy payment module configured to process payment using a credit card, a wireless communication module configured to pay for a product by communicating with a user terminal through short-range wireless communication, and a control module configured to discharge a product when the product is selected and paid for; a service server configured to provide information of the vending machine; and a user terminal configured to execute a user application to request the vending machine connected thereto through short-range wireless communication to receive information about products on sale of the vending machine from the service server, display a list of products on sale, and discharge a selected product after payment of the selected product. Products may be purchased continuously through the user application without canceling short-range wireless communication established with the vending machine.

9 Claims, 4 Drawing Sheets

(56) References Cited

U.S. PATENT DOCUMENTS

| | | | |
|---|---|---|---|
| 7,593,897 B1* | 9/2009 | Kolls | G07F 5/18 |
| | | | 700/231 |
| 7,783,379 B2* | 8/2010 | Beane | G06Q 20/40145 |
| | | | 700/244 |
| 8,191,779 B2* | 6/2012 | Illingworth | G06Q 30/0619 |
| | | | 700/231 |
| 9,064,268 B2* | 6/2015 | Larrick | G06Q 30/0641 |
| 9,245,403 B2* | 1/2016 | Geigel | G05B 15/02 |
| 9,898,884 B1* | 2/2018 | Arora | G06Q 30/0226 |
| 10,304,057 B1* | 5/2019 | Powell | G06Q 20/322 |
| 10,357,118 B2* | 7/2019 | Swafford | A47F 5/0068 |
| 2001/0034566 A1* | 10/2001 | Offer | G07F 9/001 |
| | | | 700/236 |
| 2001/0042121 A1* | 11/2001 | Defosse | G07F 9/001 |
| | | | 709/224 |
| 2002/0077724 A1* | 6/2002 | Paulucci | G07F 17/0078 |
| | | | 700/231 |
| 2002/0099608 A1* | 7/2002 | Pons | G06Q 20/04 |
| | | | 705/39 |
| 2002/0128932 A1* | 9/2002 | Yung | G07F 9/026 |
| | | | 705/28 |
| 2002/0188378 A1* | 12/2002 | Sufer | G07C 3/00 |
| | | | 700/236 |
| 2003/0030539 A1* | 2/2003 | McGarry | G07F 9/002 |
| | | | 340/5.9 |
| 2003/0178487 A1* | 9/2003 | Rogers | G07F 9/002 |
| | | | 235/454 |
| 2004/0133653 A1* | 7/2004 | Defosse | G07F 9/001 |
| | | | 709/217 |
| 2004/0243517 A1* | 12/2004 | Hansen | G06Q 20/382 |
| | | | 705/64 |
| 2004/0249711 A1* | 12/2004 | Walker | G06Q 10/06375 |
| | | | 700/231 |
| 2005/0049746 A1* | 3/2005 | Rosenblum | G16H 20/13 |
| | | | 700/232 |
| 2005/0131577 A1* | 6/2005 | Ota | G07F 9/001 |
| | | | 700/242 |
| 2005/0205666 A1* | 9/2005 | Ward | G06Q 30/02 |
| | | | 235/381 |
| 2006/0096997 A1* | 5/2006 | Yeo | G07F 9/001 |
| | | | 221/9 |
| 2006/0157560 A1* | 7/2006 | Skor | G07F 9/002 |
| | | | 235/381 |
| 2006/0217998 A1* | 9/2006 | Ota | G06Q 20/18 |
| | | | 235/381 |
| 2006/0247824 A1* | 11/2006 | Walker | G06Q 30/02 |
| | | | 700/241 |
| 2007/0083287 A1* | 4/2007 | Defosse | G06Q 20/04 |
| | | | 700/236 |
| 2007/0138265 A1* | 6/2007 | Powell | G06Q 20/3829 |
| | | | 235/381 |
| 2008/0201213 A1* | 8/2008 | Lee | G07F 9/02 |
| | | | 705/16 |
| 2009/0166375 A1* | 7/2009 | Butler | G06Q 20/123 |
| | | | 221/282 |
| 2009/0222340 A1* | 9/2009 | Insolia | G06Q 50/12 |
| | | | 705/14.31 |
| 2011/0016007 A1* | 1/2011 | Shiftan | G06Q 30/04 |
| | | | 705/16 |
| 2012/0109368 A1* | 5/2012 | Canter | G06Q 30/0237 |
| | | | 705/347 |
| 2012/0130536 A1* | 5/2012 | Canter | G06Q 20/18 |
| | | | 700/237 |
| 2013/0046604 A1* | 2/2013 | Jones | G06Q 30/0229 |
| | | | 705/14.27 |
| 2013/0046626 A1* | 2/2013 | Grigg | G06Q 30/0207 |
| | | | 705/14.53 |
| 2013/0103187 A1* | 4/2013 | Canter | G07F 9/001 |
| | | | 700/232 |
| 2013/0290146 A1* | 10/2013 | West | G07F 9/001 |
| | | | 705/27.1 |
| 2013/0331984 A1* | 12/2013 | Walker | G07F 17/16 |
| | | | 700/237 |
| 2014/0012414 A1* | 1/2014 | Perez | G07F 9/001 |
| | | | 700/241 |
| 2014/0166749 A1* | 6/2014 | Argue | G06Q 20/322 |
| | | | 700/232 |
| 2014/0179231 A1* | 6/2014 | Charania | G07F 9/001 |
| | | | 455/517 |
| 2014/0316875 A1* | 10/2014 | Tkachenko | G07F 9/002 |
| | | | 705/14.25 |
| 2014/0333664 A1* | 11/2014 | Williams | G06Q 30/0643 |
| | | | 345/633 |
| 2015/0045947 A1* | 2/2015 | Yau | G06Q 20/3223 |
| | | | 700/237 |
| 2015/0100152 A1* | 4/2015 | Barragan Trevino | G07F 9/026 |
| | | | 700/232 |
| 2015/0170130 A1* | 6/2015 | Patel | G06Q 20/405 |
| | | | 705/17 |
| 2015/0170132 A1* | 6/2015 | Patel | G07F 9/001 |
| | | | 705/44 |
| 2015/0170145 A1* | 6/2015 | Patel | G06Q 20/3278 |
| | | | 705/44 |
| 2015/0178702 A1* | 6/2015 | Patel | G07F 9/001 |
| | | | 705/21 |
| 2015/0235202 A1* | 8/2015 | Zabala | G06Q 20/326 |
| | | | 700/232 |
| 2016/0049036 A1* | 2/2016 | Nelson | F25D 23/062 |
| | | | 312/404 |
| 2016/0155127 A1* | 6/2016 | Hartman | H04N 5/772 |
| | | | 705/18 |
| 2017/0278336 A1* | 9/2017 | Kan | G06Q 20/16 |
| 2018/0240096 A1* | 8/2018 | Patel | H04W 76/15 |
| 2018/0285959 A1* | 10/2018 | Peyer | G06Q 30/0633 |
| 2019/0065999 A1* | 2/2019 | Behrooznia | G06Q 10/02 |
| 2019/0244465 A1* | 8/2019 | Saunders | G06Q 20/18 |
| 2020/0273042 A1* | 8/2020 | Wang | G07F 11/60 |
| 2021/0327203 A1* | 10/2021 | Shah | G06F 21/32 |
| 2022/0058906 A1* | 2/2022 | Dundigalla | G06Q 20/407 |

FOREIGN PATENT DOCUMENTS

| | | | | |
|---|---|---|---|---|
| KR | 10-2015-0015636 A | | 2/2015 | |
| KR | 101631663 B1 * | | 6/2016 | |
| KR | 10-2017-0028655 A | | 3/2017 | |
| KR | 10-2017-0118457 A | | 10/2017 | |
| KR | 10-2019-0018082 A | | 2/2019 | |
| KR | 10-2019-0045498 A | | 5/2019 | |
| KR | 102245608 B1 * | | 4/2021 | |
| WO | WO-2004043047 A2 * | | 5/2004 | G06Q 20/32 |

OTHER PUBLICATIONS

Non-final Office Action mailed Apr. 17, 2023 from the Korean Intellectual Property Office for Korean Application No. 10-2021-0110707.

* cited by examiner

VENDING MACHINE SYSTEM

CROSS-REFERENCE TO RELATED APPLICATION(S)

This application claims priority from Korean Patent Application No. 10-2021-0110707, filed on Aug. 23, 2021, in the Korean Intellectual Property Office, the disclosure of which is incorporated herein by reference in its entirety.

BACKGROUND

1. Field

The following description relates to a vending machine system, and more particularly, to a vending machine system for allowing a product to be purchased through an online-to-offline (O2O) terminal installed in a vending machine and an application of a user terminal.

2. Description of Related Art

Vending machines are unmanned product selling devices whereby a product is purchased by paying therefor by inserting coins, a bill, or a credit card into the vending machine and pressing a product selection button on a front side of the vending machine. Generally, vending machines are operated offline, in which products are filled in units of columns and sale prices are set by an administrator, and when a purchaser pays an amount of money and selects a product, the selected product is discharged from a corresponding column.

As such, vending machines are operated offline and thus customized services cannot be provided to people who are using the vending machines. In addition, it is practically difficult for an administrator to input an accurate quantity of products when the administrator fills a vending machine with products, and thus inventory control of the vending machine is not accurately performed. Therefore, if a desired product is out of stock when discharging the product after payment, this problem is difficult to handle and thus continuous purchase is supported rather than purchasing a bundle of products. Continuous purchase is a way of continuously selecting products while individually paying therefor.

Korean Patent Application No. 2017-0101772 proposes a method of communicating with a main control device by connecting an online-to-offline (O2O) terminal between an existing cash payment module or an existing credit card payment module and a bus to replace the cash payment module or the credit card payment module. In the method, a product can be paid for even in an existing vending machine operated offline through an application of a smart phone by simply adding an O2O terminal to the vending machine without changing software or hardware of the vending machine. However, in the case of the method, a product may be discharged out of the vending machine when a button on the vending machine is pressed immediately after payment through the application, even before the product is selected through the application. This problem may occur when, during payment of a person located a little farther away from the vending machine, another person approaches the vending machine and attempts to purchase a product while overlooking a displayed balance. To solve this problem, a time limit until a product is selected after payment should be set to be very short and thus it is difficult to support continuous purchase when payment is made through the application.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to providing a vending machine system allowing products of a vending machine to be continuously purchased through a user application of a user terminal.

The following description also relates to providing a vending machine system for providing a customized service to a user who is using a vending machine.

The following description also relates to providing a vending machine system capable of managing a vending machine through a user application of a user terminal.

In a general aspect, a vending machine system includes a vending machine, a service server, and a user terminal.

The vending machine may include at least one legacy payment module, a wireless communication module, and a control module. The legacy payment module may be a cash payment module for payment by cash or a credit card payment module for payment by a credit card. The wireless communication module may communicate with the user terminal through short-range wireless communication to pay for a product. The control module may control a product to be discharged when the product is selected and paid for.

The service server may provide information about products on sale in units of columns of the vending machine.

The user terminal may be a terminal configured to execute a user application, and the user application may create and display a list of products on sale by matching price information and out-of-stock information received in units of columns from the vending machine through short-range wireless communication with information on product on sale received in units of columns from the service server and request the vending machine to discharge a selected product after payment of the selected product. Products may be reselected and purchased continuously through the user application without canceling short-range wireless communication established with the vending machine.

When the user terminal and the wireless communication module are communicatively connected, the control module of the vending machine may disregard a control signal received from the legacy payment module and allow a product to be purchased only through the user application.

In another general aspect, while the user terminal and the wireless communication module are communicatively connected to sell products through the user application, when a production selection button on the vending machine is activated and a user presses this button to select a product, the control module of the vending machine may control the product to be discharged and request the user terminal to pay for the product through the wireless communication module.

In another general aspect, when products on sale are displayed, the user application executed in the user terminal may determine and display an array order of the products by reflecting personal preference analyzed from a previous purchase history.

In addition, the user application executed in the user terminal may request the service server to check time, a vending machine installation area, and whether a discount will be offered on the basis of a user's personal information, pay a discounted price for the product, and request the vending machine to discharge the product.

In addition, the user application executed in the user terminal may receive, from the service server, a target advertisement reflecting products on sale of the vending machine 100 connected thereto through short-range wireless communication, a vending machine installation area, an available time period, and a user's personal information, and provide the target advertisement.

In another general aspect, when it is determined that products on sale are sold out, the control module of the vending machine may transmit out-of-stock information to the service server through the user application of the user terminal connected through short-range wireless communication, and when information about a change of prices of products of the vending machine is input to the service server, the control module may receive changed price information from the service server through the user application of the user terminal communicatively connected to the vending machine and transmit price information of the vending machine.

In an additional general aspect, the vending machine system may further include an administrator terminal, and an administrator application executed in the administrator terminal may be connected to the vending machine system through short-range wireless communication to input or modify price information in units of columns of the vending machine. In addition, the administrator application may connect to the service server to input or modify product information, including price information and inventory information for each product, according to an input from an administrator.

Other features and aspects will be apparent from the following detailed description, the drawings, and the claims.

Figure 1:
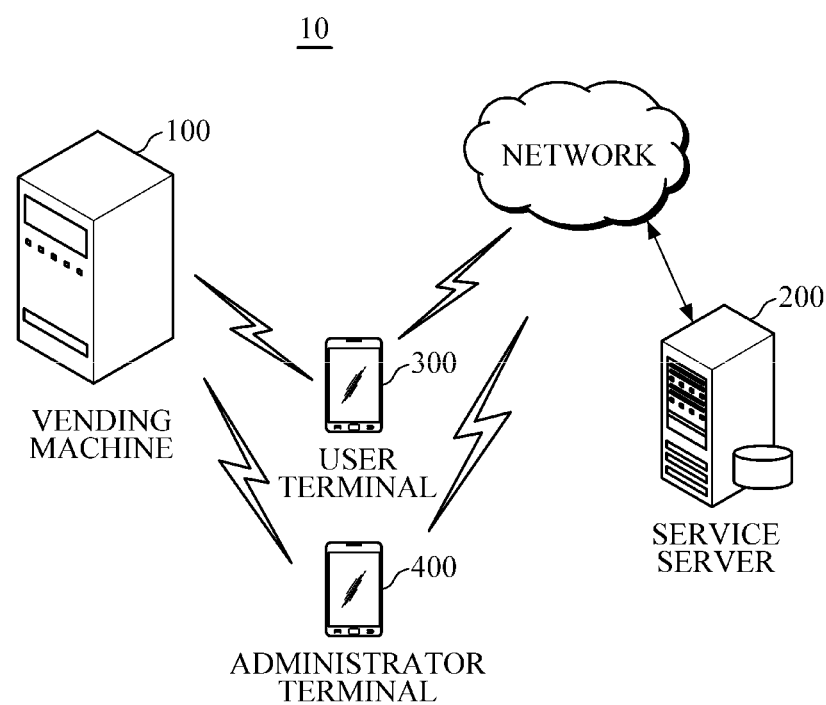
FIG. 1 is a block diagram of an example of a vending machine system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The foregoing and further aspects will be implemented through embodiments described with reference to the accompanying drawings below. It should be understood that components of embodiments can be implemented in various combinations in the embodiments unless mentioned otherwise and as long as there is no contradiction between components. Each block of block diagrams may represent a physical component in some cases but may be a logical representation of part of functions of a physical component or a function performed by a plurality of physical components. In some cases, an entity of a block or part thereof may be a set of program instructions. All or some of such blocks may be implemented by hardware, software or a combination thereof.

Figure 2:
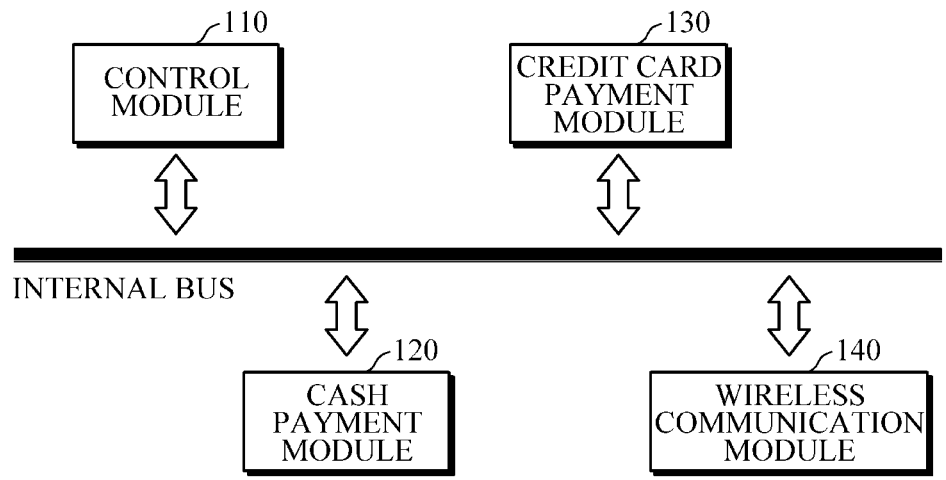
FIG. 2 illustrates the concept of an example of an internal bus configuration of a vending machine of a vending machine system.

FIG. 1 is a block diagram of an example of a vending machine system. FIG. 2 illustrates the concept of an example of an internal bus configuration of a vending machine of a vending machine system.

A vending machine system 10 according to an embodiment of the present disclosure includes a vending machine 100, a service server 200, and a user terminal 300.

The vending machine 100 is a device that may be installed in various places to automatically sell various products and includes a cash/credit card payment means, product selection buttons, a product discharge hole, a cash return means, etc. on a front side of a main body thereof.

The vending machine 100 includes at least one legacy payment module, a wireless communication module 140, and a control module 110.

The at least one legacy payment module may be a cash payment module 120 into which cash, such as coins or a bill, is inserted to make payment or a credit card payment module 130 into which a credit card is inserted to make payment. The vending machine 100 may include, as the at least one legacy payment module, any one or both of the cash payment module 120 and the credit card payment module 130. As shown in FIG. 2, the legacy payment module is assigned a unique address and connected to an internal bus of the vending machine 100, similar to an existing vending machine.

The wireless communication module 140 communicates with the user terminal 300 through short-range wireless communication to handle payment for a product. The short-range wireless communication used by the wireless communication module 140 may be Bluetooth or ZigBee but is preferably Bluetooth. The wireless communication module 140 may be a terminal configured to perform an O2O service for handling payment online through exchange of data with the user terminal 300 using the short-range wireless communication and receiving a product offline, and a component for the short-range wireless communication may be included in the wireless communication module 140 or a module for performing the short-range wireless communication may be installed in the wireless communication module 140 in the form of a dongle. As shown in FIG. 2, the wireless communication module 140 is connected to the internal bus of the vending machine 100 and is operated by being individually assigned a unique bus address, similar to the legacy payment module.

For the O2O service, the wireless communication module 140 may be communicatively connected to the user terminal 300 described below to transmit or receive data.

The control module 110 controls a product to be discharged when the product is selected and paid for. The control module 110 controls the vending machine 100 to discharge a product when the product is sold using the O2O service, i.e., through the wireless communication module 140, as well as when the product is sold through a legacy payment module of the related art. The control module 110 is also connected to the internal bus of the vending machine 100. According to an embodiment of the present disclosure, the control module 110 performs polling in units of 500 msec to check whether a message is received through bus communication. Messages received by the control module 110 include a control message including a request to discharge a selected product and a message requesting information about the vending machine 100. In addition, the control module 110 manages connection of payment means connected to the internal bus. That is, when products are sold through a payment means among the cash payment module 120, the credit card payment module 130, and the wireless communication module 140, polling may be performed only with respect to the payment means. In general, a bus communication method of the vending machine 100 is a half-duplex serial communication method. However, embodiments are not limited thereto.

The control module 110 may store inventory information in units of columns of products of the vending machine 100, but an administrator who manages the vending machine 100 is not likely to accurately input the inventory information, thus failing to predict, in advance, products that have been sold out in units of columns, and therefore may generally manage products that are out of stock by checking whether there are products to be discharged from a target column.

When a product is purchased with cash or a credit card using a legacy payment module, a product selection button is pressed to purchase the product and thus the control module 110 will not pay for the product when "sold out" is displayed on the product selection button and the product selection button is pressed, whereas in the case of the O2O service using the wireless communication module 140, when payment is made outside the vending machine 100, a situation in which the payment should be canceled may occur. For example, when the same type of products are sold in a bundle, the number of the products in stock in a corresponding column of the vending machine 100 may be less than the number of the products in a bundle and thus payment for all or some of the products in the bundle should be canceled.

The control module 110 may also transmit vending machine information, and particularly, unique information for identification of the vending machine 100 to the user terminal 300 connected thereto through the wireless communication module 140. Because multiple vending machines 100 may be installed in the same place, when a product of one of the multiple vending machines 100 is purchased using the O2O service, the vending machine 100 corresponding to the product should be identified and thus unique information for identification of the vending machine 100 is needed.

The service server 200 manages multiple vending machines 100 installed in various places. The service server 200 may manage information about products sold in each of the vending machines 100, price information of the products, inventory information of the products, and the like. Administrators who manage the vending machines 100 may access the service server 200 to input information about the products sold in the vending machines 100 and the vending machines 100.

The service server 200 provides information about products in units of columns of the vending machine 100 to a user application of the user terminal 300 used to purchase a product of the vending machine 100 using the O2O service. The information about the products may include the type of the products, inventory quantity, price information, and the like.

The user terminal 300 refers to a terminal for executing the user application and may be a mobile device such as a smart phone or a tablet PC. The user terminal 300 may be connected to the vending machine 100 through short-range wireless communication and connected to the service server 200 through the Internet using a 4G or 5G wireless network or Wi-Fi.

The user application is communicatively connected to the vending machine 100 through short-range wireless communication. When multiple vending machines 100 are installed in the same place, a user may select one of the vending machines 100 and be communicatively connected to the selected vending machine 100 through a user interface (UI) provided in the user application. When the user application is communicatively connected to the vending machine 100, the user application may receive information for identification of the vending machine 100 from the vending machine 100.

When the user application is connected to the vending machine 100 through short-range wireless communication, the user application checks whether a product is purchasable according to an O2O method, requests the vending machine 100 to provide price information and out-of-stock information in units of columns, and receives the price information and the out-of-stock information. In addition, the user application transmits a message requesting information about products sold in units of columns, including the information for identification of the vending machine 100, to the service server 200 and receives this information from the service server 200. The user application configures a user interface for selling products by matching the price information and the out-of-stock information in units of columns received from the vending machine 100 with the information about the products sold in units of columns received from the service server 200, and displays products on sale on the user interface. In this case, when data included in the out-of-stock information in units of columns received by the user application from the vending machine 100 indicates that a product is sold out, the user interface displays that products in a corresponding column cannot be selected. After payment for a product selected by a user on the user interface displayed for selecting a product, the user application of the user terminal 300 requests the vending machine 100 to discharge the product through the short-range wireless communication connected thereto. Generally, when a product is purchased, short-range wireless communication established between the vending machine 100 and the user terminal 300 is canceled when the product is discharged, but when a user selects a continuous purchase service or selects a product to be purchased before the cancelation of the short-range wireless communication, products may be continuously purchased without canceling short-range wireless communication with the vending machine 100.

Figure 3:
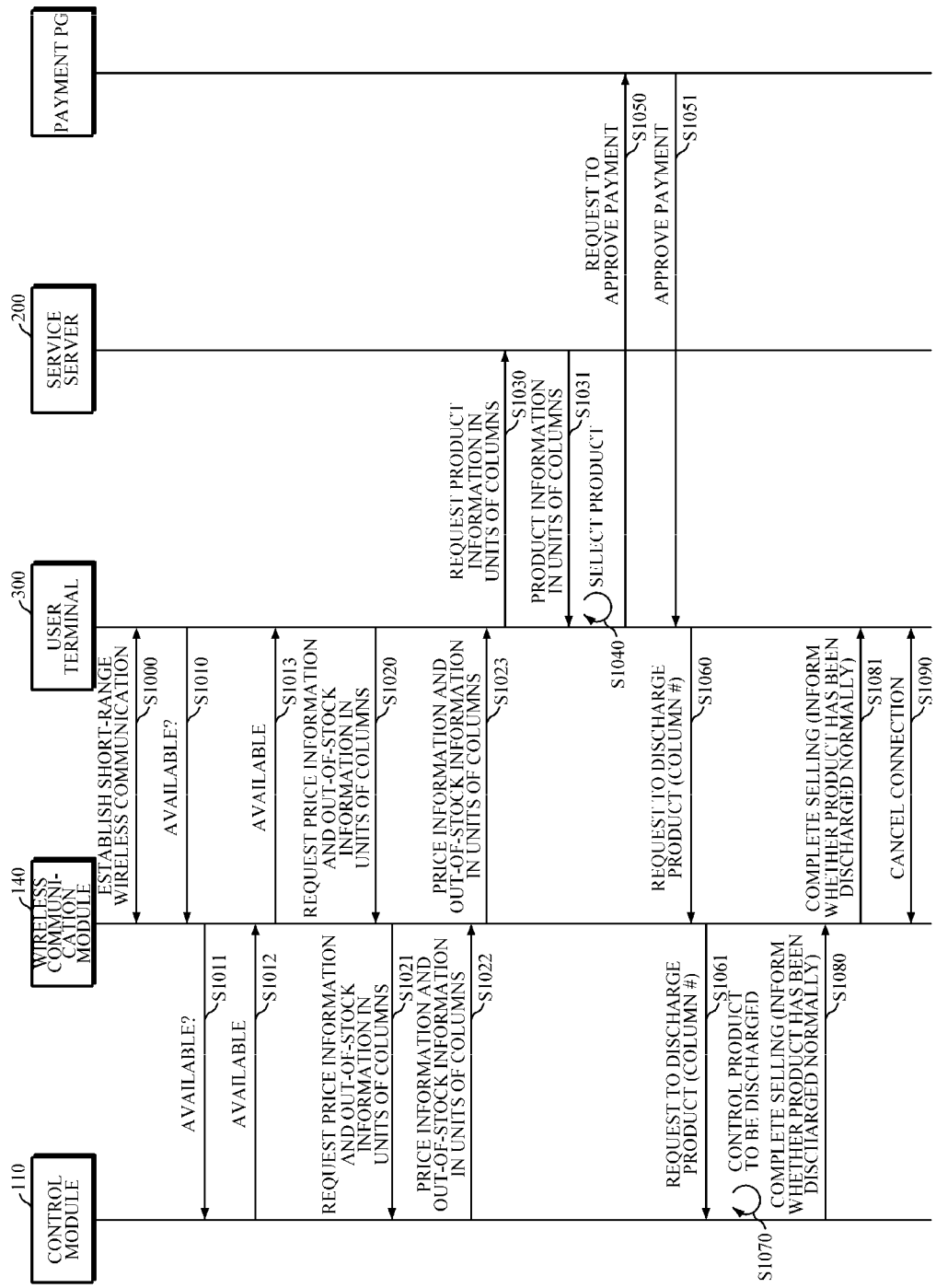
FIG. 3 illustrates an example of a process of purchasing a product of a vending machine using a user application of a vending machine system.

FIG. 3 illustrates an example of a process of purchasing a product of a vending machine using a user application of a vending machine system. Referring to FIG. 3, a user executes a user application in a user terminal 300 to purchase a product of a vending machine 100 using the O2O service. When the user application is executed, the user application attempts to establish wireless communication connection with around the vending machine 100 (S1000). In this case, when multiple vending machines 100 providing the O2O service are installed around the user, one of the vending machines 100 may need to be selected to purchase a product using the user application. When short-range wireless communication is established, the user application receives vending machine identification information from the vending machine 100. After communication is established, the user application asks a wireless communication module 140 of the vending machine 100 about whether the vending machine 100 is available (S1010). This is a process of verifying whether the vending machine 100 is being used by another user for the O2O service or whether a product of the vending machine 100 is being sold through a legacy payment module. The wireless communication module 140 asks the control module 110 about whether the vending machine 100 is available (S1011), and when receiving a response informing that the vending machine 100 is available, i.e., another user is not purchasing a product of the vending machine 100, from the control module 110 (S1012), the wireless communication module 140 transmits the response to the user application (S1013). Upon receiving the response informing that the vending machine 100 is available, the user application requests the wireless communication module 140 of the vending machine 100 to provide price information and out-of-stock information in units of columns of the vending machine 100 (S1020). The wireless communication module 140 transmits a request to provide the price information and the out-of-stock information in units of columns to the control module 110 (S1021), receives the price information and the out-of-stock information in units of columns from the control module 110 (S1022), and transmits the price information and the out-of-stock information to the user application (S1023). The user application requests the service server 200 to provide information about products sold in units of columns together with vending machine identification information (S1030) and receives the information about the products sold in units of columns from the service server 200 (S1031). The user application configures a user interface for selecting a product on sale by matching the price information and the out-of-stock information in units of columns received from the vending machine 100 with the information about the products sold in units of columns received from the service server 200 and displays the user interface. When a user selects a product through the user interface for selecting a product on sale (S1040), the user application handles payment by requesting a payment server to approve payment (S1050 and S1051). The user application requests the wireless communication module 140 to discharge the product (discharge a product out of a specific column) after the handling of the payment (S1060), and the wireless communication module 140 transmits the request to the control module 110 (S1061). The control module 110 controls the product to be discharged in response to the request (S1070), transmits, as a response, a message informing completion of the discharging of the product (S1080), and the wireless communication module 140 transmits the message to the user application (S1081). The user application maintains connection through the short-range wireless communication for a certain time and cancels the connection (S1090).

Figure 4:
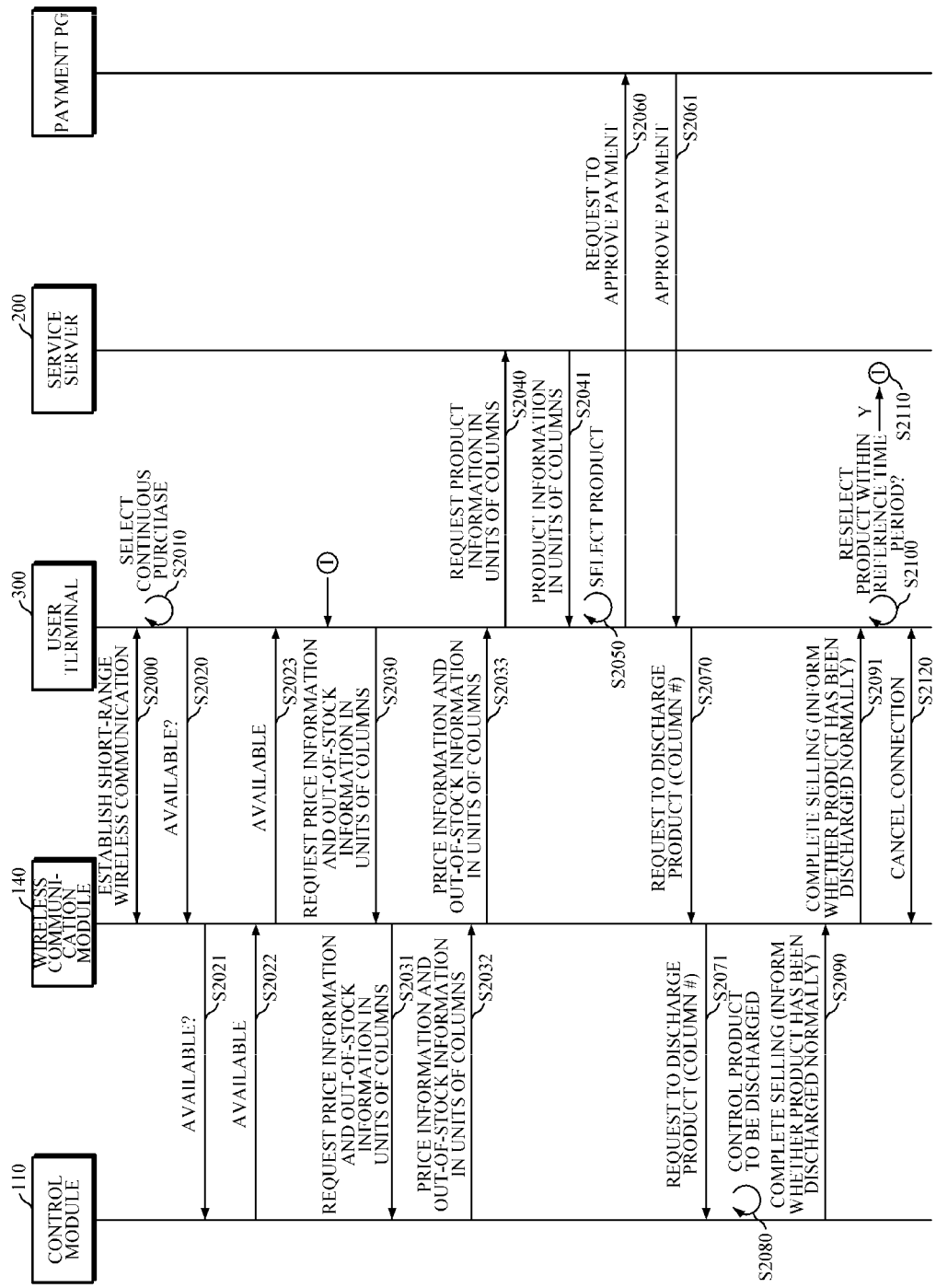
FIG. 4 illustrates an example of a process of continuously purchasing products of a vending machine using a user application of a vending machine system.

FIG. 4 illustrates an example of a process of continuously purchasing products of a vending machine using a user application of a vending machine system. Referring to FIG. 4, a user executes a user application in a user terminal 300 to purchase a product of a vending machine 100 using the O2O service. When the user application is executed, the user application attempts to establish wireless communication connection with around the vending machine 100 (S2000). In this case, when multiple vending machines 100 providing the O2O service are installed around the user, one of the vending machines 100 may need to be selected to purchase a product using the user application. When short-range wireless communication is established, the user application receives vending machine identification information from the vending machine 100. After communication is established, the user selects continuous purchase in the user application (S2010). The user application asks a wireless communication module 140 of the vending machine 100 about whether the vending machine 100 is available (S2020). The wireless communication module 140 asks the control module 110 about whether the vending machine 100 is available (S2021). When receiving a response informing that the vending machine 100 is available, i.e., another user is not purchasing a product of the vending machine 100, from the control module 110 (S2022), the wireless communication module 140 transmits the response to the user application (S2023). Upon receiving the response informing the user that the vending machine 100 is available, the user application requests the wireless communication module 140 of the vending machine 100 to provide price information and out-of-stock information in units of columns of the vending machine 100 (S2030). The wireless communication module 140 transmits a request to provide the price information and the out-of-stock information in units of columns to the control module 110 (S2031), receives the price information and the out-of-stock information in units of columns from the control module 110 (S2032), and transmits the price information and the out-of-stock information to the user application (S2033). The user application requests the service server 200 to provide information about products sold in units of columns together with vending machine identification information (S2040) and receives the information about the products sold in units of columns from the service server 200 (S2041). The user application configures a user interface for selecting a product on sale by matching the price information and the out-of-stock information in units of columns received from the vending machine 100 with the information about the products sold in units of columns received from the service server 200 and displays the user interface. When a user selects a product through the user interface for selecting a product on sale (S2050), the user application handles payment by requesting a payment server to approve payment (S2060 and S2061). The user application requests the wireless communication module 140 to discharge the product (discharge the product out of a column accommodating the product) after the handling of the payment (S2070), and the wireless communication module 140 transmits the request to the control module 110 (S2071). The control module 110 controls the product to be discharged in response to the request (S2080), transmits, as a response, a message informing completion of the discharging of the product (S2090), and the wireless communication module 140 transmits the message to the user application (S2091). The user application waits for a certain time until the user selects another product. When the user selects another product (S2100), the above operations are performed again, starting from the requesting the wireless communication module 140 of the vending machine 100 to provide price information and out-of-stock information in units of columns of the vending machine 100 (S2110). When the user does not select another product in the set time or selects to end continuous purchase, the user application cancels short-range wireless communication with the vending machine 100 to end continuous purchase (S2120).

When the user terminal 300 and the wireless communication module 140 are communicatively connected, the control module 110 of the vending machine 100 may disregard a control signal transmitted from the legacy payment module and allow a product to be purchased only through the user application.

That is, because the control module 110 of the vending machine 100 manages connection between payment means connected to the internal bus, when product sales are performed through a payment means among the cash payment module 120, the credit card payment module 130, and the wireless communication module 140, polling may be performed with respect to the payment means and thus a control signal generated by the other modules may be disregarded. Therefore, when a user purchases a product through the user application in the user terminal 300 to use the O2O service, payment for a product through the legacy payment module is blocked.

According to another embodiment of the present disclosure, when the user terminal 300 and the wireless communication module 140 of the vending machine 100 are communicatively connected to sell products through the user application of the user terminal 300 and a product is selected by pressing a product selection button on the vending machine 100, the control module 110 of the vending machine 100 may control the product to be discharged and request the user terminal 300 to pay for the product through the wireless communication module 140.

When a user purchases a product by pressing a product selection button on the vending machine 100 while standing in front of the vending machine 100, instead of using the user application, the product may be discharged out of the vending machine 100 although the product is not paid for and the user application may be informed of this fact to pay for the product. That is, the user may purchase a product by pressing the product selection button on the vending machine 100 in a state in which the product is purchasable through the user application, and the product may be paid for using the O2O service through the user application.

According to another embodiment of the present disclosure, when products on sale are displayed, the user application executed in the user terminal 300 may determine an array order of the products by reflecting personal preference analyzed from a previous purchase history and configure and display a user interface according to the array order.

That is, when a user repeatedly uses the same vending machine 100 or uses a vending machine 100 for sales of the same type of products as the vending machine 100 that the user has frequently used, the user application may configure and display a user interface by changing an array of products by reflecting personal preference analyzed from a previous purchase history so that the user may easily select a product that the user has often purchased.

In addition, the user application executed in the user terminal 300 may request the service server 200 to check product sales time, a vending machine installation area, and whether a discount will be offered on the basis of a user's personal information, pay a discounted price for the product, and request the vending machine 100 to discharge the product.

An administrator may connect to the service server 200 to set a discount sale of products of the vending machine 100 for a user who purchases a product using the O2O service. The administrator may determine to offer a discount with respect to a specific product in a specific time period. The administrator may determine to offer discount sales only with respect to a vending machine 100 installed in a particular area. In addition, the administrator may determine to offer discount sales on the basis of a user's personal information, i.e., the user's gender, age or the like.

The user application executed in the user terminal 300 may receive product sale information from the service server 200 together with customized discount sales information and pay a discounted price, which is set regardless of a sale price of the vending machine 100, for the product.

An example of discount sales provided by the vending machine system 10 may include bundle discount sales. The bundle discount sales refer to discount sales in which an additional product is provided when a predetermined number of products are purchased. For example, (2+1) bundle discount sales are sales in which one product is additionally offered when two products are purchased. In the case of bundle discount sales, requests to discharge a product are consecutively transmitted to the vending machine 100 after making payment through the user application, but when the number of products is sufficient and thus the products are sold out, the control module 110 of the vending machine 100 senses this fact and transmits out-of-stock information to the user application through the wireless communication module 140. Upon receiving the out-of-stock information during the bundle discount sales, the user application may request the service server 200 to issue a (1+1) discount coupon or a free coupon with respect to a corresponding product.

The user application executed in the user terminal 300 may receive, from the service server 200, a target advertisement reflecting products on sale in the vending machine 100 connected thereto through short-range wireless communication, a vending machine installation area, an available time period, and a user's personal information, and provide the target advertisement.

According to another embodiment of the present disclosure, the control module 110 of the vending machine 100 may transmit out-of-stock information to the user application of the user terminal 300 connected thereto through short-range wireless communication when products on sale are out of stock. Upon receiving the out-of-stock information, the user application may transmit the out-of-stock information to the service server 200.

A particular product may be out of stock after a product of the vending machine 100 is purchased for through the user application executed in the user terminal 300. In this case, the control module 110 of the vending machine 100 may identify that products in a corresponding column are sold out and transmit out-of-stock information to the user application through the wireless communication module 140. The user application receiving the out-of-stock information from the vending machine 100 may transmit the out-of-stock information to the service server 200 so that the service server 200 may notify an administrator of this fact.

After short-range wireless communication is established between the user application and the vending machine 100 and identification information of the vending machine 100 is received, the user application requests the vending machine 100 to provide price information and out-of-stock information in units of columns and receive the price information and the out-of-stock information. In this case, when information included in the out-of-stock information indicates that products in a specific column are sold out, the user application may transmit the out-of-stock information to the service server 200 so that the service server 200 may notify the administrator of this fact.

When an administrator connects to the service server 200 to input information about a change of prices of products of the vending machine 100, i.e., when this information is input to the service server 200, the service server 200 may transmit changed price information of the vending machine 100 through the user application of the user terminal 300 communicatively connected to the vending machine 100 so that the prices of the products of the vending machine 100 may be updated.

The service server 200 may transmit the changed price information to the vending machine 100 through the user application of the user terminal 300 first connected after the information about the change of the prices of products is input to the service server 200. The service server 200 may notify the user application, which is requesting information about products on sale, of the changed price information, and in this case, the user application transmits the changed price information to the vending machine 100.

According to an additional embodiment of the present disclosure, the vending machine 10 may further include an administrator terminal 400.

At a place in which the vending machine 100 to be managed is installed, an administrator may connect to the vending machine 100 using an administrator application executed in the administrator terminal 400 through short-range wireless communication and input or modify price information in units of columns to the vending machine 100.

In addition, the administrator may connect to the service server 200 through the administrator application to input or modify product information including price information and inventory information of each product. In this case, when short-range wireless communication is established between the administrator terminal 400 and the vending machine 100, the information of which has been modified, the service server 200 may transmit price information of a column of products with changed price information to the administrator application, and the administrator application receiving the price information may transmit the changed price information to the vending machine 100 through short-range wireless communication.

According to a vending machine system of the present disclosure, products of a vending machine can be continuously purchased through a user application of a user terminal.

According to the vending machine system of the present disclosure, a customized service can be provided to a user using the vending machine.

In addition, according to the vending machine system of the present disclosure, the vending machine can be managed through the user application of the user terminal.

While the present disclosure has been described above with respect to embodiments in conjunction with the accompanying drawings, the present disclosure is not limited thereto and should be interpreted to cover various modifications that will be apparent to those of ordinary skill in the art. The claims are intended to cover such modifications.

What is claimed is:

1. A vending machine system comprising:
   a vending machine comprising:
   at least one legacy payment module configured to process payment using cash or a credit card;
   a wireless communication module configured to pay for a product by communicating with a user terminal through short-range wireless communication; and
   a control module configured to discharge a product when the product is selected and paid for;
   a service server configured to provide product information in units of columns of the vending machine; and
   a user terminal configured to execute a user application for creating and displaying a list of products on sale by matching price information and out-of-stock information received in units of columns from the vending machine with product information received in units of columns from the service server and requesting the vending machine to discharge a selected product after payment of the selected product,
   wherein, before a set time has elapsed after a transaction comprising product selection, payment of the selected product, and request for discharging of the selected product is completed through the user application, products are reselectable and purchasable continuously through the user application without canceling short-range wireless communication with the vending machine, and
   wherein the control module of the vending machine verifies whether another user is purchasing a product through a wireless communication module or a legacy payment module and then notifies the user application of the user terminal connected through short-range wireless communication whether the vending machine is available.

2. The vending machine system of claim 1, wherein, when the user terminal and the wireless communication module are communicatively connected, the control module disregards a control signal received from the legacy payment module.

3. The vending machine system of claim 1, wherein, when products on sale are displayed, the user application determines and displays an array order of the products by reflecting personal preference analyzed from a previous purchase history.

4. The vending machine system of claim 1, wherein the user application requests the service server to check time, a vending machine installation area, and whether a discount sale is to be offered on the basis of a user's personal information, pays a discounted price for the product, and requests the vending machine to discharge the product.

5. The vending machine system of claim 1, wherein the user application receives, from the service server, a target advertisement reflecting products of the vending machine connected thereto through short-range wireless communication, a vending machine installation area, an available time period, and a user's personal information, and provides the target advertisement.

6. The vending machine system of claim 1, wherein, when products on sale are sold out, the control module transmits out-of-stock information to the user application connected thereto through short-range wireless communication, and the user application transmits the out-of-stock information to the service server.

7. The vending machine system of claim 1, wherein, when information about a change of prices of products of the vending machine is input to the service server, the service server transmits changed price information to the vending machine through the user application communicatively connected to the vending machine.

8. The vending machine system of claim 1, further comprising an administrator terminal configured to execute an administrator application to be connected to the vending machine through short-range wireless communication so as to input or modify price information in units of columns of the vending machine.

9. The vending machine system of claim 8, wherein the administrator application connects to the service server to input or modify product information including price information and inventory information according to an input from an administrator.

* * * * *